(12) United States Patent
Prescott et al.

(10) Patent No.: US 9,900,086 B2
(45) Date of Patent: Feb. 20, 2018

(54) SHOOTING LONG FIBER SPANS WITH HIGH LOSS FIBER

(71) Applicant: AFL TELECOMMUNICATIONS LLC, Duncan, SC (US)

(72) Inventors: Scott H. Prescott, Belmont, NH (US); Sean Patrick Adam, Wrentham, MA (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 15/115,023

(22) PCT Filed: Jan. 29, 2015

(86) PCT No.: PCT/US2015/013519
§ 371 (c)(1),
(2) Date: Jul. 28, 2016

(87) PCT Pub. No.: WO2015/116817
PCT Pub. Date: Aug. 6, 2015

(65) Prior Publication Data
US 2016/0344473 A1 Nov. 24, 2016

Related U.S. Application Data

(60) Provisional application No. 61/934,174, filed on Jan. 31, 2014.

(51) Int. Cl.
*H04B 10/071* (2013.01)
*H04B 10/079* (2013.01)

(52) U.S. Cl.
CPC ....... *H04B 10/071* (2013.01); *H04B 10/0799* (2013.01)

(58) Field of Classification Search
None
See application file for complete search history.

(56) References Cited

U.S. PATENT DOCUMENTS 5,187,362 A 2/1993 Keeble
5,552,881 A 9/1996 Jezwinski et al.
(Continued)

FOREIGN PATENT DOCUMENTS

JP 2008203184 A 9/2008
WO WO 9525274 A1 9/1995

OTHER PUBLICATIONS

AFL Telecommunications, LLC; International Patent Application No. PCT/US2015/013519; International Search Report; dated May 6, 2015; (2 pages).
(Continued)

*Primary Examiner* — Darren E Wolf
(74) *Attorney, Agent, or Firm* — Dority & Manning, P.A.

(57) ABSTRACT

A method of tracing a complete span of a fiber includes inferring a reference point on the fiber based on a measured length of the fiber, setting a pulse width and a measurement range based on the inferred reference point, shooting a fiber from a master unit, attached to one end of the fiber, to collect trace past the inferred reference point, shooting a fiber from a slave unit, attached to an opposite end of the fiber, to collect trace past the inferred reference point, cropping the collected traces captured by the master unit and the slave unit past the inferred reference point, inverting a slope of the trace of the slave unit using measurement loss information and combining the trace of the master unit and the trace of the slave unit, with the inverted slope, to obtain a complete and accurate trace of the fiber.

15 Claims, 6 Drawing Sheets

(56) References Cited

U.S. PATENT DOCUMENTS

2006/0198634 A1 9/2006 Ofalt et al.
2009/0060498 A1 3/2009 Libeskind et al.
2014/0029934 A1 1/2014 Xia et al.

OTHER PUBLICATIONS

AFL Telecommunications LLC; European Patent Application No. 15743626.2; Supplementary European Search Report; dated Aug. 24, 2017; (1 page).

US 9,900,086 B2

SHOOTING LONG FIBER SPANS WITH HIGH LOSS FIBER

CROSS-REFERENCE TO RELATED APPLICATIONS

This application is based upon and claims the benefit of priority from U.S. Provisional Patent Application No. 61/934,174, filed Jan. 31, 2014 in the United States Patent and Trademark Office, and as a U.S. national stage filing of International Application No. PCT/US2015/01351.9 having an international filing date of Jan. 29, 2015, the disclosures of both of which are incorporated by reference herein in their entireties.

BACKGROUND

1. Field

The invention is related to event detection and mapping across the complete span of a fiber, and more particularly to measurement of the complete span distance of a fiber, measurement of complete loss across the span of the fiber, event detection and mapping across the complete span of a fiber and achieving trace showing the complete span of the fiber.

2. Related Art

The background information provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Long spans of fiber—on the order of 200 km—with splices every 5 km—made up of fiber with 0.3 dB/km loss and 0.1 dB per-splice loss drives the need for over 64 dB of dynamic range. To detect events on such a span—across the complete span—an optical time-domain reflectometer (OTDR) would require 70 dB of dynamic range. This is far beyond the capability of products in the field today.

In the current optical technology, no OTDR can shoot the complete span and measure the length of the fiber described above as it would require over 64 dB of dynamic range.

While high loss spans can be difficult to shoot, long spans in general are difficult to shoot for the same reasons as described above. While OTDRs can shoot 200 Kilometers (km) low loss spans, the event spacing/resolution can be poor due to the wide pulse widths required to do so. Accordingly, using shorter pulse widths on some long spans for better event location/resolution. Use of a 20 uS pulse width gives up to a 2 km location uncertainty as well as burying any events spaced closer than 2 km apart.

Therefore, there is a need for the ability to shoot a long fiber span for measurement of complete span distance, which cannot be simply estimated, measurement of complete loss across span, event detection and mapping across complete span and for acquiring a trace showing complete span of the fiber, so that the customer has confidence the fiber has not be tampered with or modified.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

According to an aspect of an exemplary embodiment, a method of tracing a complete span of a fiber includes inferring a reference point on the fiber based on a measured length of the fiber, setting a pulse width and a measurement range based on the inferred reference point, shooting a fiber from a master unit, attached to one end of the fiber, to collect trace past the inferred reference point, shooting a fiber from a slave unit, attached to an opposite end of the fiber, to collect trace past the inferred reference point, cropping the collected traces captured by the master unit and the slave unit past the inferred reference point, inverting a slope of the trace of the slave unit using measurement loss information, and combining the trace of the master unit and the trace of the Slave Unit, with the inverted slope, to obtain a complete and accurate trace of the fiber.

According to another exemplary embodiment, the pulse width and the measurement range are set to be greater than half the measured length of the fiber.

According to an aspect of another exemplary embodiment, a non-transitory computer readable recording medium storing a program used in an apparatus, including at least one processor, for tracing a complete span of a fiber, causes said at least one processor to infer a reference point on the fiber based on a measured length of the fiber, set a pulse width and a measurement range based on the inferred reference point, shoot a fiber from a master unit, attached to one end of the fiber, to collect trace past the inferred reference point, shoot a fiber from a slave unit, attached to an opposite end of the fiber, to collect trace past the inferred reference point, crop the collected traces captured by the master unit and the slave unit past the inferred reference point, invert a slope of the trace of the slave unit using measurement loss information, and combine the trace of the master unit and the trace of the slave unit, with the inverted slope, to obtain a complete and accurate trace of the fiber.

According to another exemplary embodiment, the program further causes the said at least one processor to set the pulse width and the measurement range to be greater than half the measured length of the fiber.

According to an as of another exemplary embodiment, an apparatus for tracing a complete span of a fiber the apparatus includes at least one memory operable to store program code, at least one processor operable to read the program code and operate as instructed by the program code, the program code including inferring code configured to cause the at least one processor to infer a reference point on the fiber based on a measured length of the fiber, setting code configured to cause the at least one processor to set a pulse width and a measurement range based on the inferred reference point, first shooting code configured to cause the at least one processor to shoot a fiber from a master unit, attached to one end of the fiber, to collect trace past the inferred reference point, second shooting code configured to cause the at least one processor to shoot a fiber from a slave unit, attached to an opposite end of the fiber, to collect trace past the inferred reference point, cropping code configured to cause the at least one processor to crop the collected traces captured by the master unit and the slave unit past the inferred reference point, inverting code configured to cause the at least one processor to invert a slope of the trace of the slave unit using measurement loss information, and combining code configured to cause the at least one processor to combine the trace of the master unit and the trace of the slave unit, with the inverted slope, to obtain a complete and accurate trace of the fiber.

According to another exemplary embodiment, the setting code is further configured to cause the at least one processor to set the pulse width and the measurement range to be greater than half the measured length of the fiber.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1:
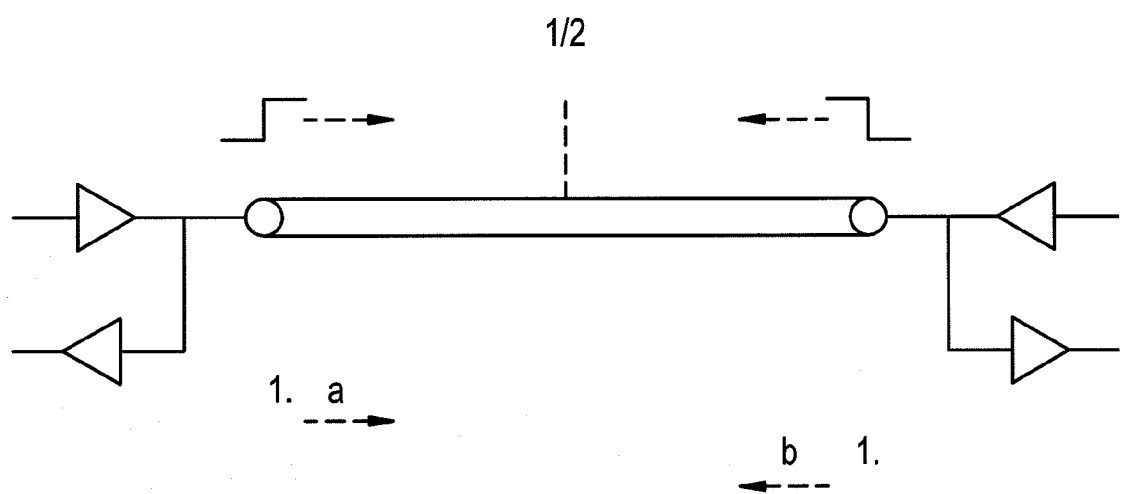
FIG. 1 illustrates a fiber with a master and slave connected to opposite ends to determine the length of the fiber, according to an exemplary embodiment.

Referring to the drawings, FIG. 1 illustrates a fiber with a master and slave connected to opposite ends to determine the length of the fiber, according to an exemplary embodiment.

According to an exemplary embodiment, the two ends attached to the fiber may be made up of two units. One may function in a master mode and the other may function in a slave mode. The terms master mode and slave mode are merely used as exemplary embodiments and are interchangeable with main mode/remote mode and other terminology well known to one of ordinary skill in the art. The master unit may be attached to one end of the fiber. The slave may be attached to the opposite end of the fiber.

To measure the length of the fiber, the master unit sends a light pulse or a set of light pulses, as shown by the arrows in FIG. 1, with a time stamp encoded in the pulse train, according to exemplary embodiments. The slave unit receives the light pulse or the set of light pulses with the encoded time stamp and rebroadcasts the pulse/pulses to the master.

If using the single light pulse method, the master calculates the time it took from firing the pulse to receiving the pulse back from the slave, thereby calculating the round-trip time.

If using the train of light pulses with the time stamp of the master encoded in the pulse train, the master subtracts the time stamp from the it's current time reference, thereby again calculating the total round-trip time.

Accordingly, the length of the fiber can be calculated using the following formula for calculating the time of flight in one direction:

$$\text{Time of Flight in one direction} = (\text{Calculated Round-Trip-Time in seconds})/2.$$

Thus, the length of the fiber can be calculated using the time of flight calculation using the above formula.

The conversion to meters is based on the Fiber Index of Refraction. Accordingly, using the above describes exemplary embodiments, an accurate length measurement of the fiber can be achieved.

Figure 2:
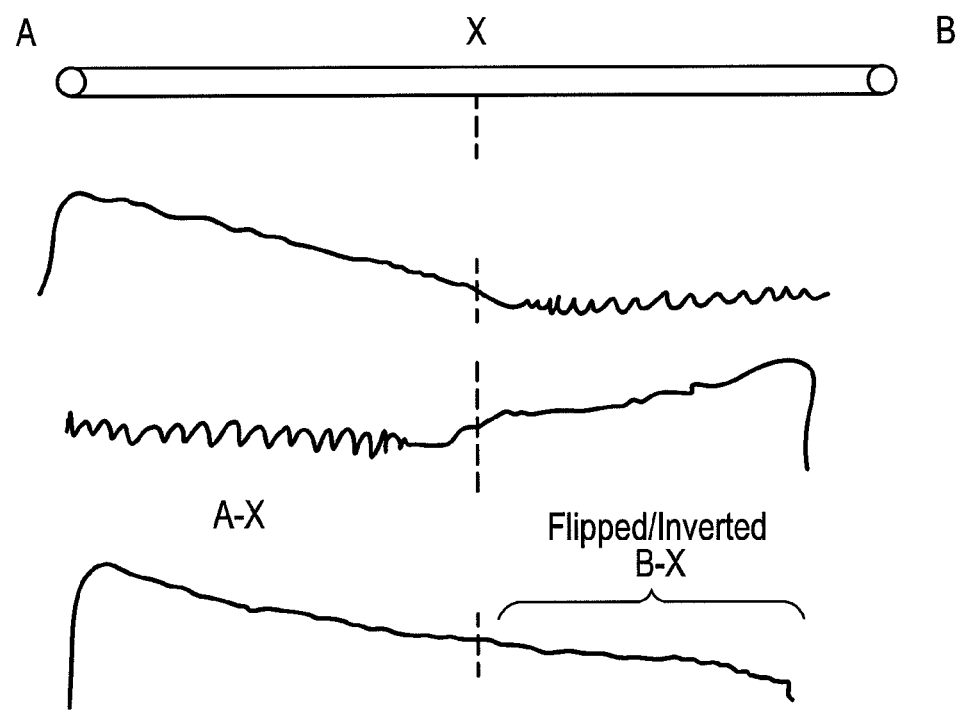
FIG. 2 illustrates a fiber going through a process of tracing a complete span and event detection, according to an exemplary embodiment.

FIG. 2 illustrates a fiber going through a process of tracing a complete span and event detection, according to an exemplary embodiment.

No OTDR today can shoot the complete span of a fiber. Therefore an accurate trace cannot be created and all events cannot be detected. With today's OTDRs, one can shoot from either side of the span; however, without having some known reference point, you cannot attach the traces from either end of the span into a single, coherent, accurate trace of the complete span of the fiber.

According to an exemplary embodiment described in FIG. 1, the Length can be accurately measured as described above. Therefore, a known reference point can be inferred by using the mid-point of the span as the known reference point.

For example, if the span is 200 km long, then the mid-point is exactly 100 km from either end. The Master unit sets its pulse width (PW) and measurement range to 0.5*measure length+25% (the 25% being added as buffer). This means it sets the appropriate PW to shoot 120 km and chooses the appropriate range to measure 120 km, according to the exemplary embodiment.

Accordingly, after knowing the known reference point and performing the calculation, the Master unit shoots the fiber and collects the trace. At some point beyond 120 km, the trace enters the noise floor. However, the length of interest is the first 100 km which has been clearly captured and therefore, accurate event detection can be performed on it.

In the same manner, the Slave unit shoots the fiber and collects the trace. At some point beyond 120 km, the trace enters the noise floor. However, the length of interest is the first 100 km which has been clearly captured and therefore, accurate event detection can be performed on it.

In the exemplary embodiment of FIG. 2, if A is considered the master end of the fiber, the trace captured on the Master unit is cropped to remove anything occurring after the midpoint X.

In the same manner, the trace captured on the Slave unit B is cropped to remove anything occurring after the midpoint X. The remaining trace of the slave end B-X is then inverted. Specifically, by taking the measurement loss information, the slope of the trace is inverted, as shown in FIG. 2.

Now a complete and accurate trace of the span is provided with complete event analysis. Using the same analysis, the complete loss can also be determined.

Figure 3:
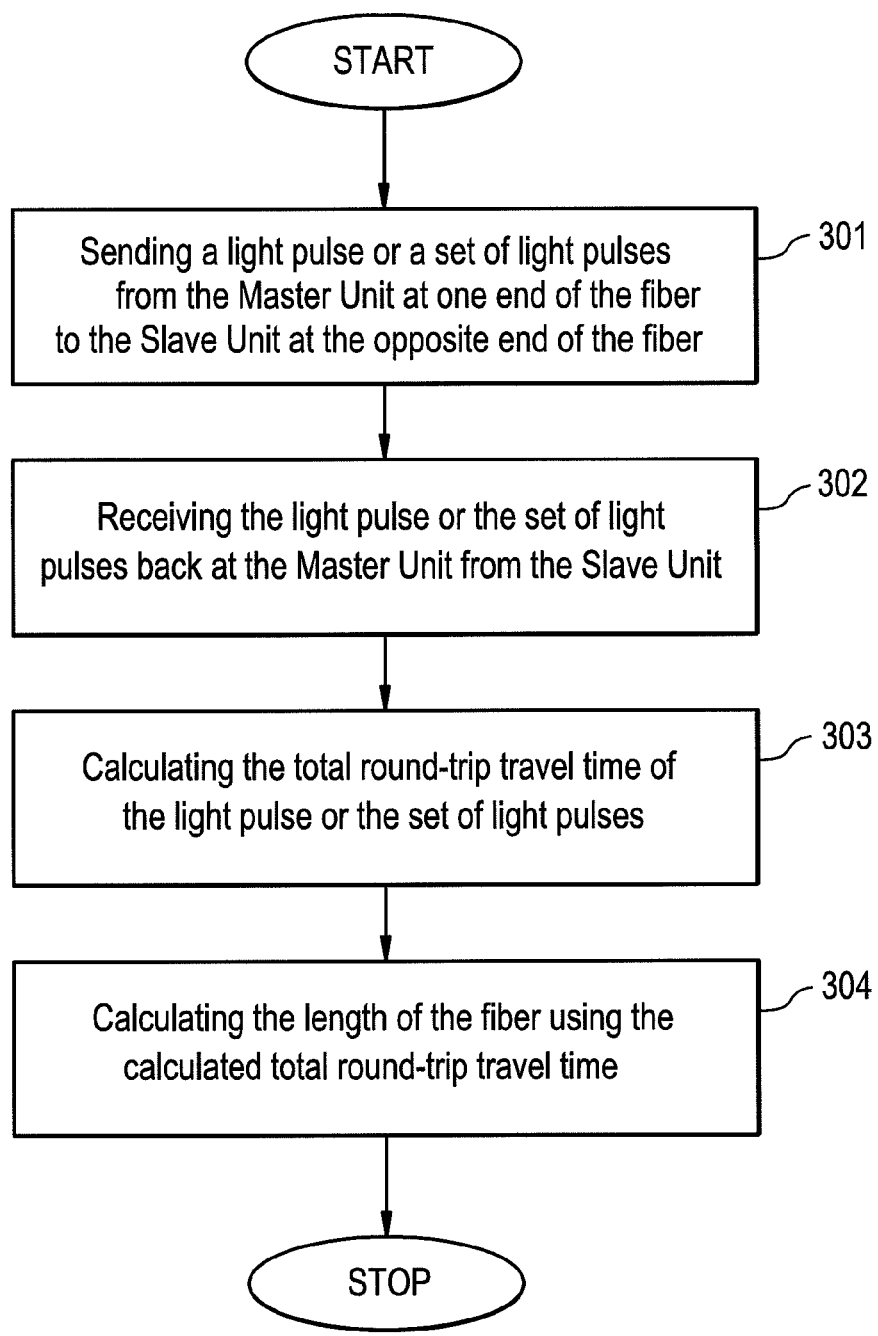
FIG. 3 is a flowchart describing a method of determining the length of a fiber currently used by other OTDRs available in the market, according to another exemplary embodiment.

FIG. 3 is a flowchart describing a method of determining the length of a fiber, according to another exemplary embodiment.

The method first includes sending a light pulse or a set of light pulses from the Master Unit at one end of the fiber to the slave unit at the opposite end of the fiber 301. Following that the master unit receives the light pulse or the set of light pulses back from the slave unit 302.

Step 303 incorporated calculating the total round-trip travel time of the light pulse or the set of light pulses. Finally, step 304 incorporates calculating the length of the fiber using the calculated total round-trip travel time, according to an exemplary embodiment.

The above described method for measuring length of the fiber is used by the T400 and C840 optical loss test sets (OLTS) and the C850 OLTS/OTDR for length measurement.

Figure 4:
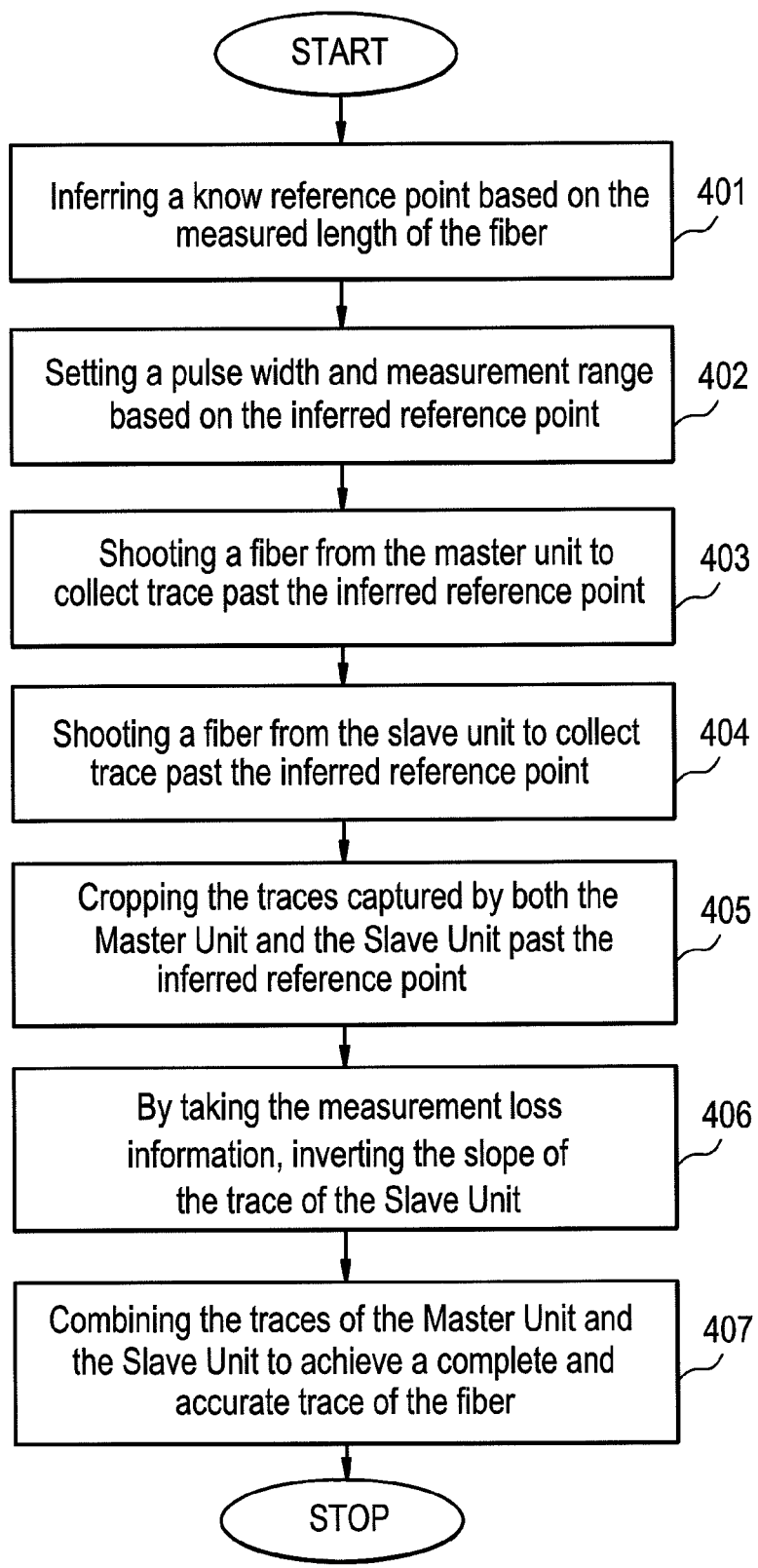
FIG. 4 is a flowchart describing a method of tracing a complete span and event detection in a fiber, according to another exemplary embodiment.

FIG. 4 is a flowchart describing a method of tracing a complete span and event detection in a fiber, according to another exemplary embodiment.

The method first includes Inferring a known reference point based on the measured length of the fiber 401. Following that a pulse width and measurement range is set based on the inferred reference point 402.

Step 403 incorporated shooting a fiber from the master unit to collect trace past the inferred reference point. Step 404 incorporates shooting a fiber from the slave unit to collect trace past the inferred reference point.

In step 405, traces captured by both the master unit and the Slave Unit are cropped past the inferred reference point. In step 406, by taking the measurement loss information, the slope of the trace of the slave unit is inverted. Finally, step 407 incorporates combining the traces of the master unit and the slave unit to achieve a complete and accurate trace of the fiber, according to an exemplary embodiment, as described with reference to FIG. 2 above.

Figure 5:
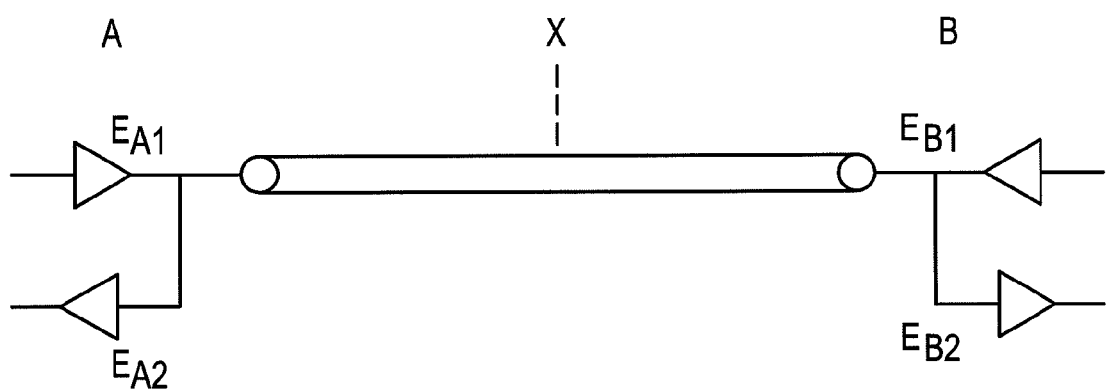
FIG. 5 illustrates a fiber with a master and slave connected to opposite ends to determine the length of the fiber while incorporating the errors in the time of flights of light pulses, according to an exemplary embodiment.

FIG. 5 illustrates a fiber with a master and slave connected to opposite ends to determine the length of the fiber while incorporating the errors in the time of flights of light pulses, according to an exemplary embodiment.

As depicted in FIG. 5, the error in the time of flight for a light pulse sent from A to B will be $Ea1+Eb2$. Similarly, the error in the time of flight from B to A will be $Eb1+Ea2$.

Accordingly, the total time of flight from A to B incorporating the errors can be calculated by the following formula:

Time of Flight1=Time of Flight $A$–$B$+$Ea1$+$Eb2$

Similarly, the total time of flight from B to A incorporating the errors can be calculated by the following formula:

Time of Flight2=Time of Flight $B$–$A$+$Ea2$+$Eb1$

As the time of flight from A to B is the same as the time of flight from B to A, the error term can be calculated using the following formula:

Time of flight 1–Time of flight 2=$(Ea1+Eb2)$–$(Eb1+Ea2)$=$Eab$

Furthermore, the following formula uses the error term to provides us with the average time of flight:

Average time of flight=(Time of flight 1+Time of flight 2–$Eab$)/2

Figure 6:
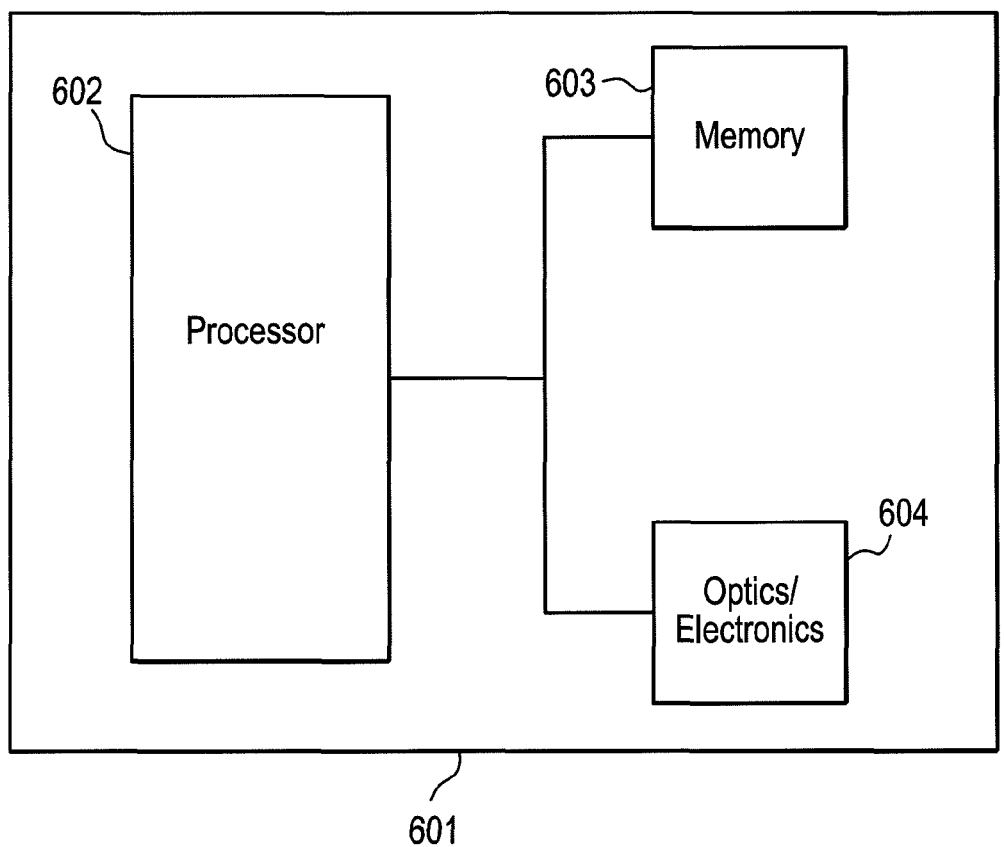
FIG. 6 illustrates a functional block diagram of an embodiment of an apparatus which determines a length of a fiber, traces a complete span of a fiber, and performs event detection in a fiber, according to an exemplary embodiment.

FIG. 6 illustrates a functional block diagram of an embodiment of an apparatus which determines a length of a fiber, traces a complete span of a fiber, and performs event detection in a fiber, according to an exemplary embodiment.

The apparatus 601 includes a memory 603, a processor 602, and an Optics/Electronics unit 604, according to an exemplary embodiment. An example of a processor is an ARM Xscale 806 Mhz processor. An example of a memory is an 8 Gbit NAND flash memory. Accordingly, the memory may store a program code/operating software which in-turn instructs the processor 602/Optics/Electronics 604 to measure the complete span distance, which cannot be simply estimated, measure the complete loss across span, perform event detection and map across complete span to acquire a trace showing complete span of the fiber, as described in FIGS. 1-5 above. The program code/operating software can also be stored on a non-transitory computer readable medium.

The different exemplary embodiments described above provide a more accurate trace and event profile compared to a single side shot with a high power OTDR. They further allow use of shorter PW than required to shoot a complete span and use a shorter range than required to shoot the complete span thereby providing increased resolution. Furthermore, they allow use of a less dynamic range OTDR providing a more cost effective and practical solution.

Although certain benefits of the described embodiments are listed above, the benefits are not limited thereto.

As mentioned above, the embodiments described above are merely exemplary and the general inventive concept should not be limited thereto. While this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

The invention claimed is:

1. A method of tracing a complete span of a fiber, the method comprising:
    measuring an end-to-end length of the fiber;
    determining a reference point along the end-to-end length of the fiber, wherein the reference point is specified at a location between the ends of the fiber along the end-to-end length of the fiber;
    setting a pulse width and a measurement range to be greater than a distance from each end of the fiber to the reference point;
    shooting a fiber from a master unit, attached to one end of the fiber, to collect trace past the reference point;
    shooting a fiber from a slave unit, attached to an opposite end of the fiber, to collect trace past the reference point;
    cropping the collected traces captured by the master unit and the slave unit past the reference point;
    inverting a slope of the trace of the slave unit using measurement loss information; and
    combining the trace of the master unit and the trace of the slave unit, with the inverted slope, to obtain a complete and accurate trace of the fiber.

2. The method according to claim 1 wherein the setting the pulse width and the measurement range comprises setting the pulse width and the measurement range to be greater than half the measured length of the fiber.

3. A non-transitory computer readable recording medium storing a program used in an apparatus, including at least one processor, for tracing a complete span of a fiber, the program causing said at least one processor to:

measure an end-to-end length of the fiber;

determine a reference point on the fiber along the end-to-end length of the fiber, wherein the reference point is specified at a location between the ends of the fiber along the end-to-end length of the fiber;

set a pulse width and a measurement range to be greater than a distance from each end of the fiber to the reference point;

shoot a fiber from a master unit, attached to one end of the fiber, to collect trace past the reference point;

shoot a fiber from a slave unit, attached to an opposite end of the fiber, to collect trace past the reference point;

crop the collected traces captured by the master unit and the slave unit past the reference point;

invert a slope of the trace of the slave unit using measurement loss information; and combine the trace of the master unit and the trace of the slave unit, with the inverted slope, to obtain a complete and accurate trace of the fiber.

4. The non-transitory computer readable recording medium according to claim 3 wherein the program further causes the said at least one processor to set the pulse width and the measurement range to be greater than half the measured length of the fiber.

5. An apparatus for tracing a complete span of a fiber the apparatus comprising:

at least one memory operable to store program code;

at least one processor operable to read the program code and operate as instructed by the program code, the program code including:

measuring code configured to cause the at least one processor to measure an end-to-end length of the fiber;

determining code configured to cause the at least one processor determine a reference point on the fiber along the end-to-end length of the fiber, wherein the reference point is specified at a location between the ends of the fiber along the end-to-end length of the fiber;

setting code configured to cause the at least one processor to set a pulse width and a measurement range to be greater than a distance from each end of the fiber to the reference point;

first shooting code configured to cause the at least one processor to shoot a fiber from a master unit, attached to one end of the fiber, to collect trace past the reference point;

second shooting code configured to cause the at least one processor to shoot a fiber from a slave unit, attached to an opposite end of the fiber, to collect trace past the reference point;

cropping code configured to cause the at least one processor to crop the collected traces captured by the master unit and the slave unit past the reference point;

inverting code configured to cause the at least one processor to invert a slope of the trace of the slave unit using measurement loss information; and combining code configured to cause the at least one processor to combine the trace of the master unit and the trace of the slave unit, with the inverted slope, to obtain a complete and accurate trace of the fiber.

6. The apparatus according to claim 5 wherein the setting code is further configured to cause the at least one processor to set the pulse width and the measurement range to be greater than half the measured length of the fiber.

7. The apparatus according to claim 1, wherein the reference point is at a midpoint of the fiber.

8. The non-transitory computer readable recording medium according to claim 3, wherein the reference point is at a midpoint of the fiber.

9. The apparatus according to claim 5, wherein the reference point is at a midpoint of the fiber.

10. The apparatus according to claim 1, wherein setting the pulse width and the measurement range comprises setting the pulse width and the measurement range of the master unit and the slave unit, the master unit and the slave unit respectively connected to the opposing ends of the fiber, wherein the master unit is configured to collect trace data from the one end of the fiber to a first point beyond the reference point in a first direction along the end-to-end length of the fiber, and wherein the slave unit is configured to collect trace data from the opposite end of the fiber to a second point beyond the reference point in a second opposite direction along the end-to-end length of the fiber.

11. The apparatus of claim 10, wherein the first point beyond the reference point is determined by adding a buffer length to the reference point in the first direction, and wherein the second point beyond the reference point is determined by adding a buffer length to the reference point in the second opposite direction.

12. The non-transitory computer readable recording medium according to claim 3, wherein setting the pulse width and the measurement range comprises setting the pulse width and the measurement range of the master unit and the slave unit, the master unit and the slave unit respectively connected to the opposing ends of the fiber, wherein the master unit is configured to collect trace data from the one end of the fiber to a first point beyond the reference point in a first direction along the end-to-end length of the fiber, and wherein the slave unit is configured to collect trace data from the opposite end of the fiber to a second point beyond the reference point in a second opposite direction along the end-to-end length of the fiber.

13. The non-transitory computer readable recording medium according to claim 12, wherein the first point beyond the reference point is determined by adding a buffer length to the reference point in the first direction, and wherein the second point beyond the reference point is determined by adding a buffer length to the reference point in the second opposite direction.

14. The apparatus of claim 5, wherein setting the pulse width and the measurement range comprises setting the pulse width and the measurement range of the master unit and the slave unit, the master unit and the slave unit respectively connected to the opposing ends of the fiber, wherein the master unit is configured to collect trace data from the one end of the fiber to a first point beyond the reference point in a first direction along the end-to-end length of the fiber, and wherein the slave unit is configured to collect trace data from the opposite end of the fiber to a second point beyond the reference point n a second opposite direction along the end-to-end length of the fiber.

15. The apparatus of claim 14, wherein the first point beyond the reference point is determined by adding a buffer length to the reference point in the first direction, and wherein the second point beyond the reference point is determined by adding a buffer length to the reference point in the second opposite direction.

* * * * *